(12) United States Patent
Seita (10) Patent No.: US 6,975,464 B2
(45) Date of Patent: Dec. 13, 2005

(54) DIAPHRAGM DEVICE FOR LIGHT SOURCE LIGHT ADJUSTMENT

(75) Inventor: Masato Seita, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 15 days.

(21) Appl. No.: 10/830,109

(22) Filed: Apr. 23, 2004

(65) Prior Publication Data

US 2004/0212900 A1    Oct. 28, 2004

(30) Foreign Application Priority Data

Apr. 24, 2003  (JP) ............................... 2003-119789

(51) Int. Cl.[7] ............................. G02B 9/00; G02B 7/02
(52) U.S. Cl. ...................... 359/739; 359/814; 359/738
(58) Field of Search ............................... 359/738–740, 359/694, 703, 704, 814, 824

(56) References Cited

U.S. PATENT DOCUMENTS 4,233,650 A * 11/1980 Hagner et al. ............... 362/552

FOREIGN PATENT DOCUMENTS

| JP | 6-37400 | 9/1994 |
|---|---|---|
| JP | 07-099002 | 4/1995 |
| JP | 09-311363 | 12/1997 |
| JP | 2001-174910 | 6/2001 |
| JP | 2002-072361 | 3/2002 |

* cited by examiner

Primary Examiner—Ricky Mack
(74) Attorney, Agent, or Firm—Pillsbury Winthrop Shaw Pittman LLP (57) ABSTRACT

A diaphragm device has a first base plate and a second base plate that are installed with a predetermined interval therebetween and formed into a unit. The diaphragm device is installed to a mounting portion of a lens frame such that the second base plate is disposed adjacently to a light source. The two base plates are partitioned with an intermediate plate to form two accommodating chambers, a stopping-down blade and a covering blade being disposed in each accommodating chamber. A motor is attached to the first base plate to relatively rotate a set of plate members and another set of plate members so as to restrict optical path apertures by the stopping-down blades. Portions directly exposed to light source light are provided with gray or white heat-resistant painting.

12 Claims, 6 Drawing Sheets

DIAPHRAGM DEVICE FOR LIGHT SOURCE LIGHT ADJUSTMENT

BACKGROUND OF THE INVENTION

1. Field of the Invention

The present invention relates to a diaphragm device for light source light adjustment ideally disposed in the vicinity of a light source of a projecting apparatus, a projector, or the like.

2. Description of the Related Art

There has been known a projecting apparatus used for lighting on a stage or at a studio that has a diaphragm device disposed near a light source to restrict the projecting range or projecting configuration of light emitted from a light source (refer to Japanese Unexamined Patent Application Publication No. 7-99002). It is known that liquid crystal projectors and other various types of projectors have diaphragm devices disposed near light sources to temporarily change the quantity of lighting according to the brightness of projection room or to change projection images. Especially in the case of a liquid crystal projector, disposing such a diaphragm device is known to make it possible to restrain deterioration of a liquid crystal panel (refer to Japanese Unexamined Patent Application Publication No. 2001-174910).

In a projecting apparatus or a projector, the area near a light source becomes hot due to visible light rays or infrared rays emitted from the light source. Therefore, heat radiating measures or heat resistance measures have always been major considerations in developing projecting apparatuses or projectors. The diaphragm device disclosed in the Japanese Unexamined Patent Application Publication No. 2001-174910 is provided as heat measures for a liquid crystal panel.

However, diaphragm devices provided for such purposes may fail to function if they are overheated by intense light of light sources. To prevent such a problem, therefore, a protective means, such as a shutter, having a special construction is provided between a diaphragm device and a light source to primarily block infrared rays from a light source, as described in the Japanese Unexamined Patent Application Publication No. 7-99002. Disposing such a special protective means between the diaphragm device and the light source makes it possible to protect the diaphragm device from overheating.

Projecting apparatuses are recently being used for a variety of displays used indoors and outdoors, and with its accelerating demand, the number of types thereof is increasing. In addition, there has been growing needs for inexpensive, smaller types. With the advent of data projectors, such as liquid crystal projectors, the projectors are being frequently carried around by sales persons to perform presentation of products. This has led to the need for smaller, inexpensive projecting apparatuses featuring good portability.

Thus, an attempt to respond to the need for lower cost and compactness by adding protective means that have complicated constructions is not a successful solution. Hence, there has been a demand for developing ideal measures for protecting diaphragm devices from overheating without the need for providing such special protecting means.

SUMMARY OF THE INVENTION

Accordingly, it is an object of the present invention to provide a diaphragm device for light source light adjustment that permits easy prevention of overheating by devising the construction of the diaphragm device itself without the need for providing a protective means with a complicated construction between the diaphragm device and a light source.

To this end, a diaphragm device for light source light adjustment in accordance with the present invention includes two base plates disposed in the vicinity of the light source, each of which having an aperture for an optical path, an accommodating chamber being formed therebetween, and one of which being disposed adjacently to a light source, and two stopping-down blades that are disposed in the accommodating chamber and move toward or away from the apertures by relatively reciprocating so as to restrict the sizes of the diaphragm apertures by aperture restricting edges thereof, wherein at least the adjacent-to-the-light-source surface of the base plate disposed adjacently to the light source and the adjacent-to-the-light-source surface of a member exposed to the light of the light source are provided with gray or white heat-resistant painting, the member being mounted on the base plate disposed adjacently to the light source.

In this case, if an electromagnetic driving means is mounted on the base plate of the two base plates that is disposed on the opposite side from the light source outside the accommodating chamber, and an output means thereof is constructed to reciprocate the stopping-down blades in the accommodating chamber, then the electromagnetic driving means will be resistant to heat damage. Finishing the end surfaces of the opening restricting edges of the stopping-down blades with black will be ideal, because it will restrain diffused reflection on the end surfaces. Providing the base plate disposed adjacently to the light source with a protective member for cutting off infrared rays so as to substantially cover the front surface of the base plate adjacent to the light source makes it possible to restrain overheating attributable to infrared rays.

Furthermore, if the two stopping-down blades are rotatively installed to one of the two base plates and the opening restricting edges are formed to have substantially arcuate shapes, then the device will be ideally fitted to be installed in a lens frame (lens barrel). In such a case, if at least one of the two stopping-down blades is constructed of a stopping-down blade having the opening restricting edge and a covering blade that is simultaneously rotated when the stopping-down blade is rotated and has a rotation angle that is smaller than that of the stopping-down blade, then the device will be extremely advantageous for a limited installation space.

These and other features and advantages of the present invention will be apparent from the following detailed description of the preferred embodiments when taken in conjunction with the accompanying drawings.

DESCRIPTION OF THE PREFERRED EMBODIMENTS

Figure 1:
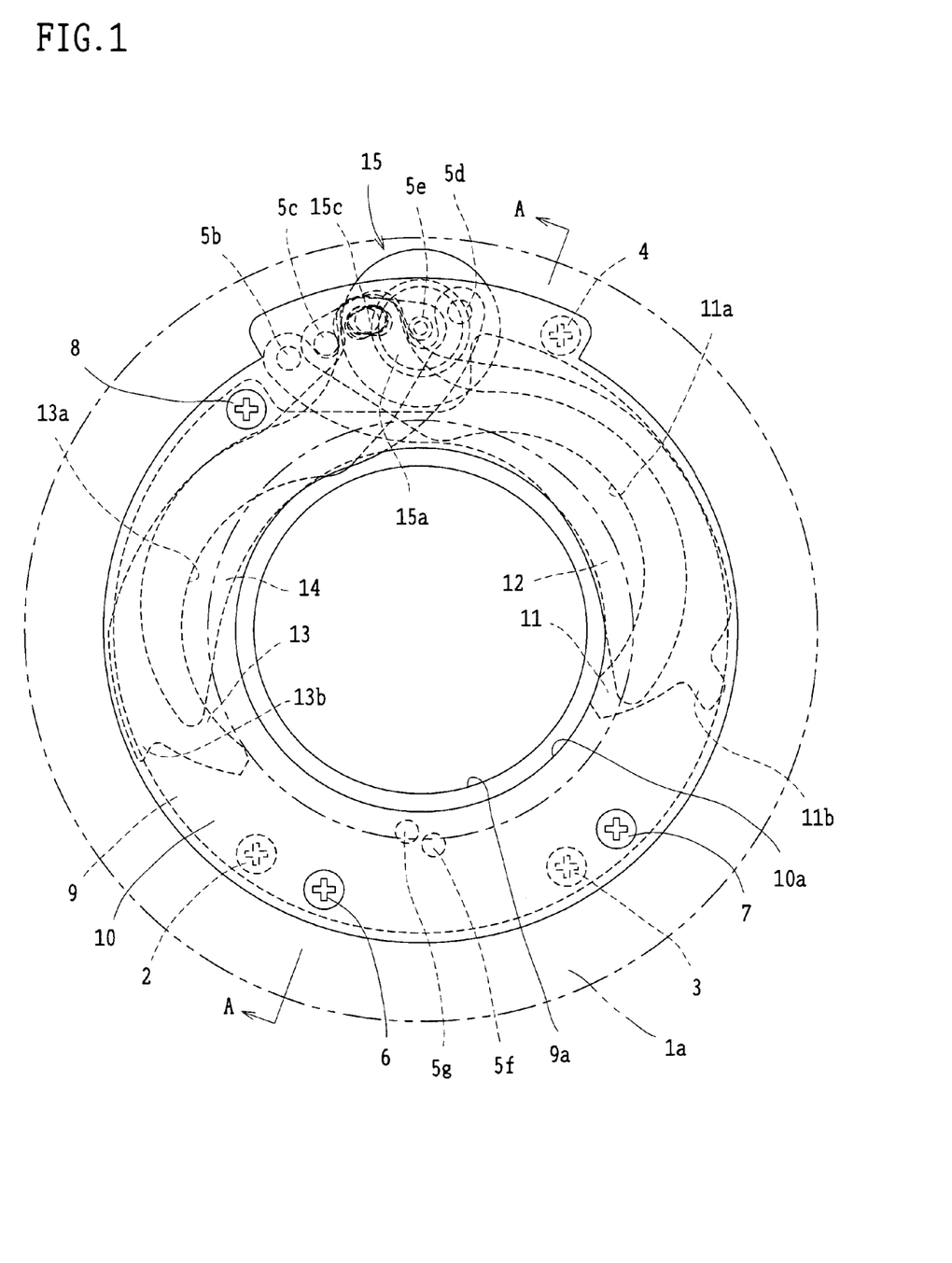
FIG. 1 is a front view of a first embodiment observed from a light source side, an aperture for an optical path being fully open.
Figure 2:
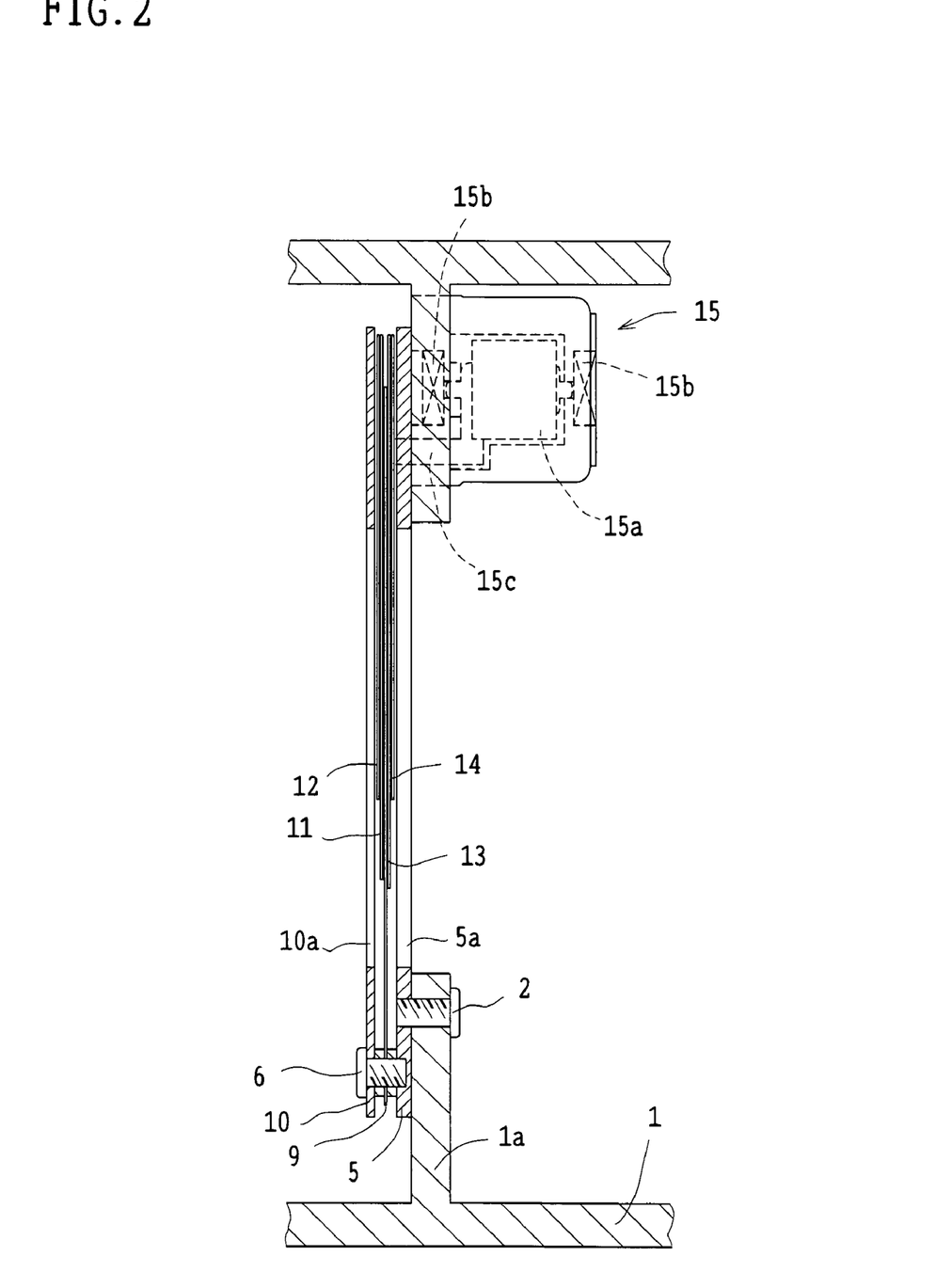
FIG. 2 is a sectional view taken along line A—A shown in FIG. 1.
Figure 3:
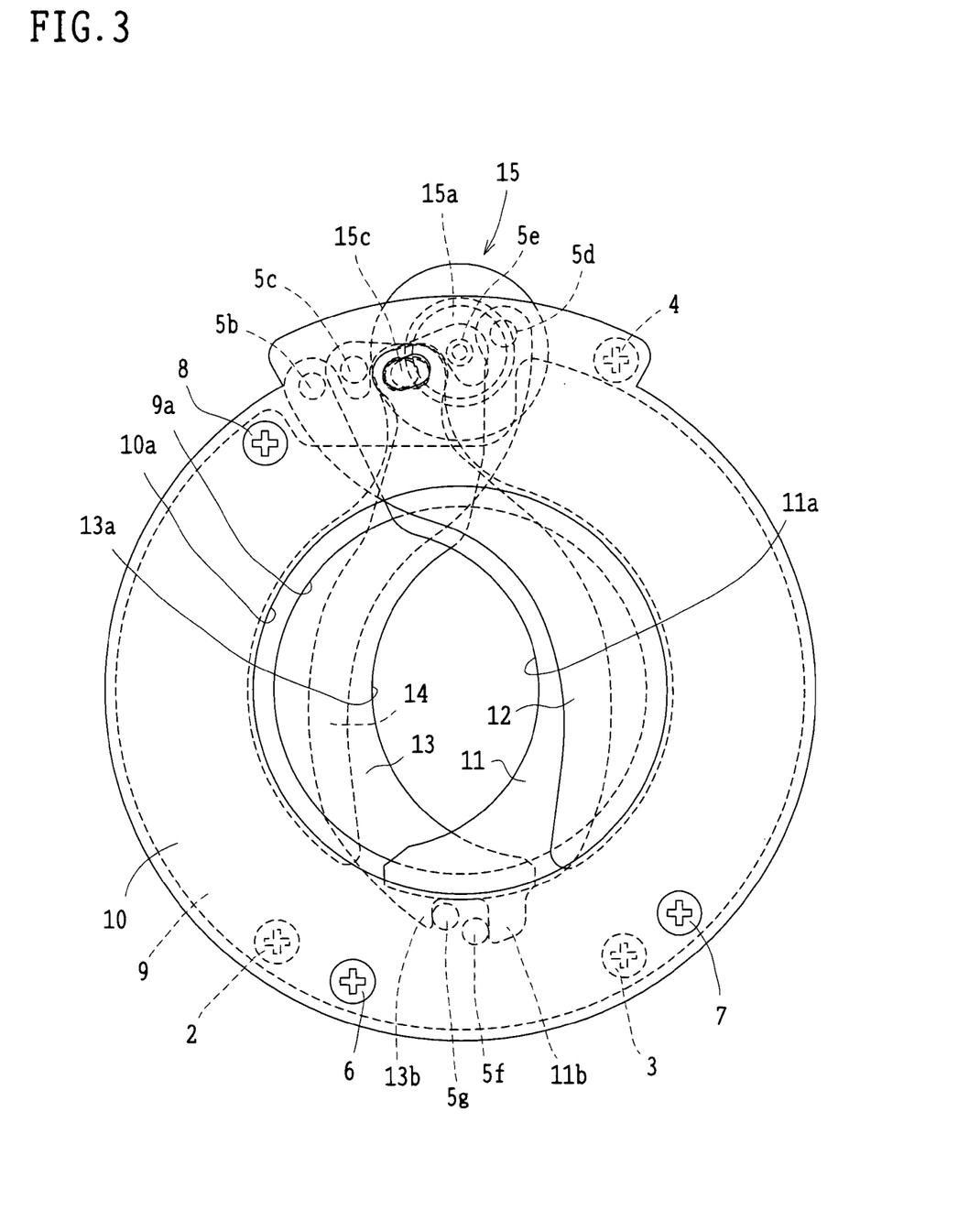
FIG. 3 is a front view of a first embodiment, in which a stopped-down optical path aperture for an optical path is observed from a light source side.
Figure 4:
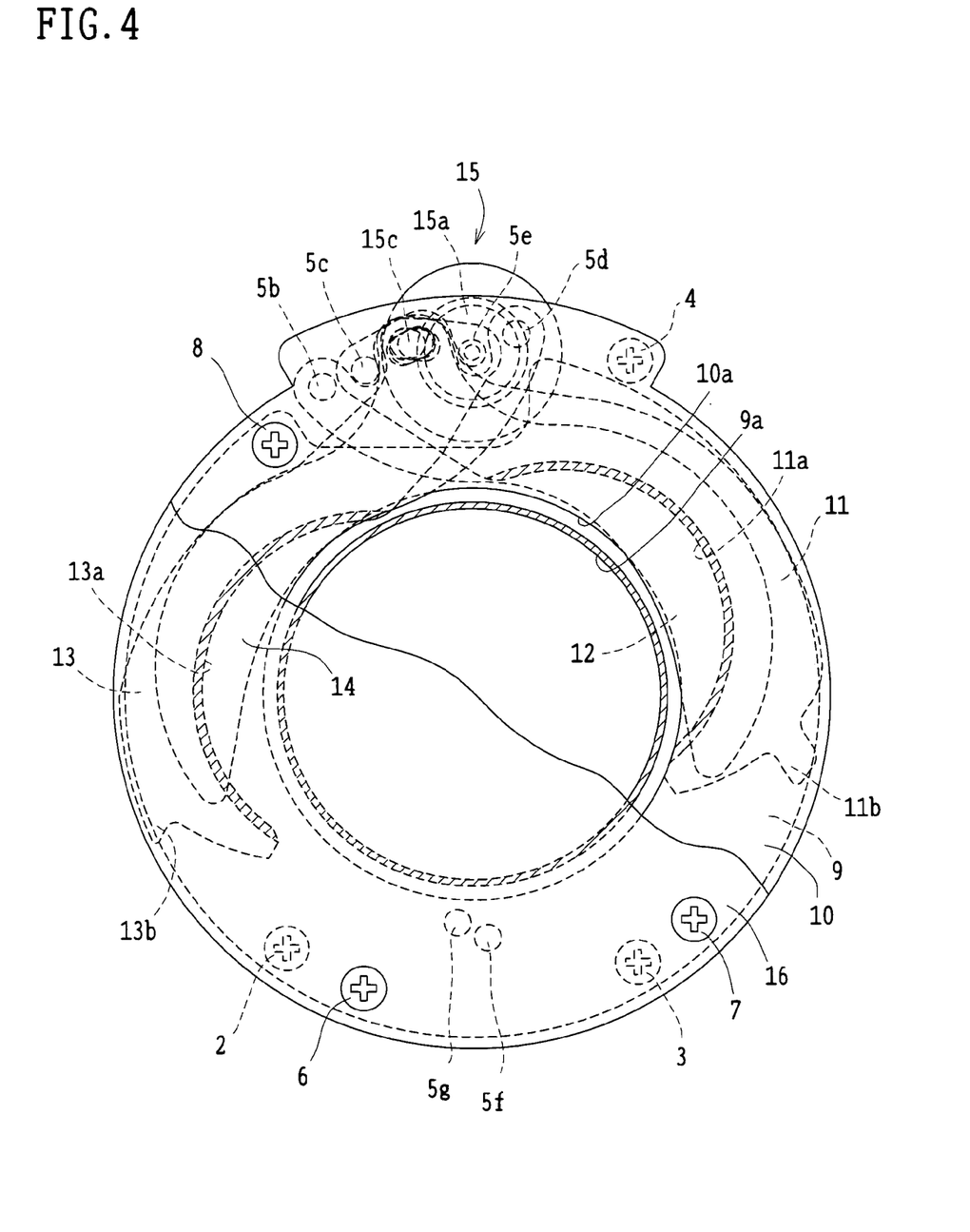
FIG. 4 is a front view of a second embodiment, in which a fully opened optical path aperture is observed from the light source side.
Figure 5:
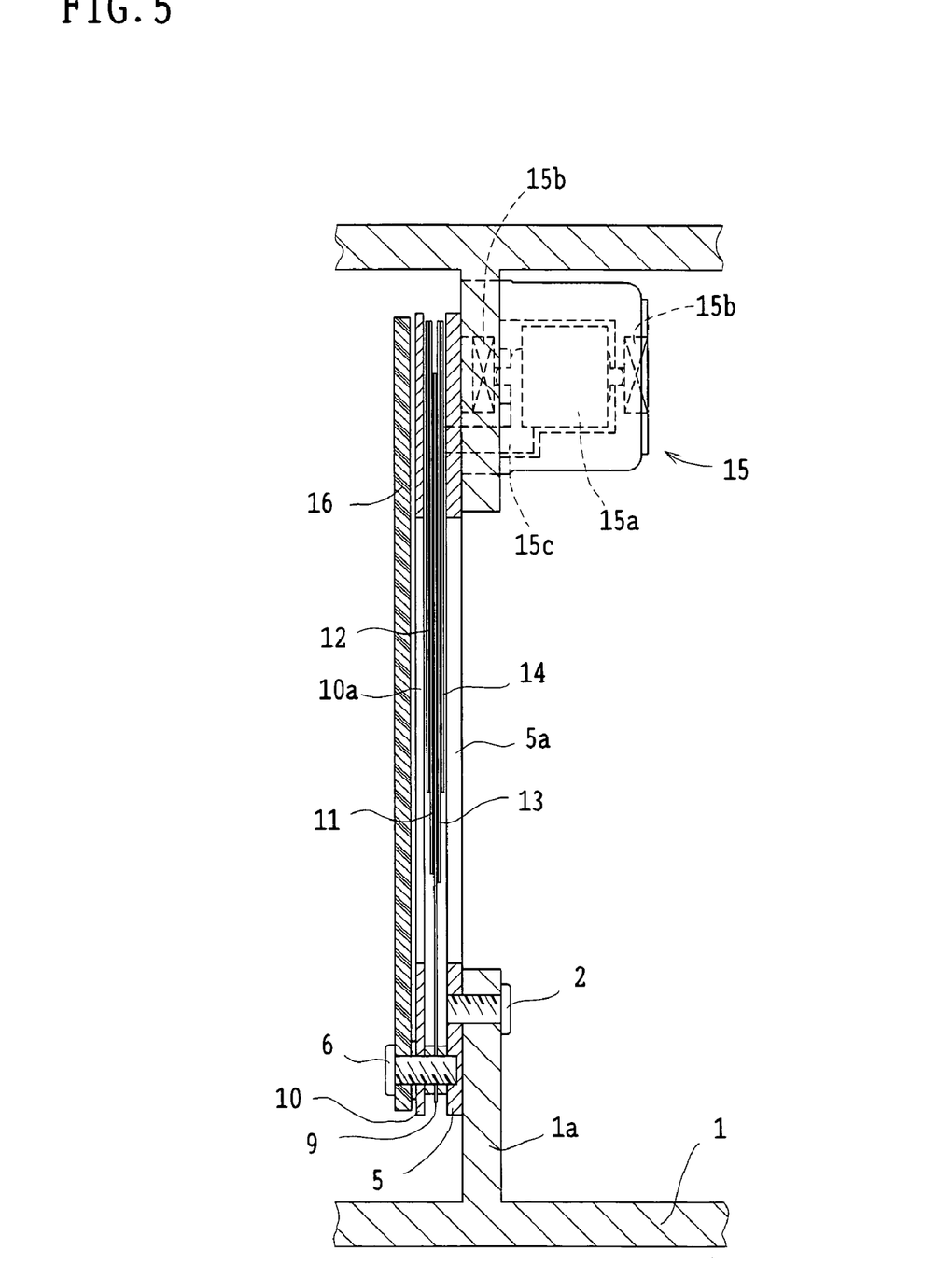
FIG. 5 is a sectional view of the second embodiment shown in FIG. 4, which has been cut substantially in the same manner as that in FIG. 2.
Figure 6:
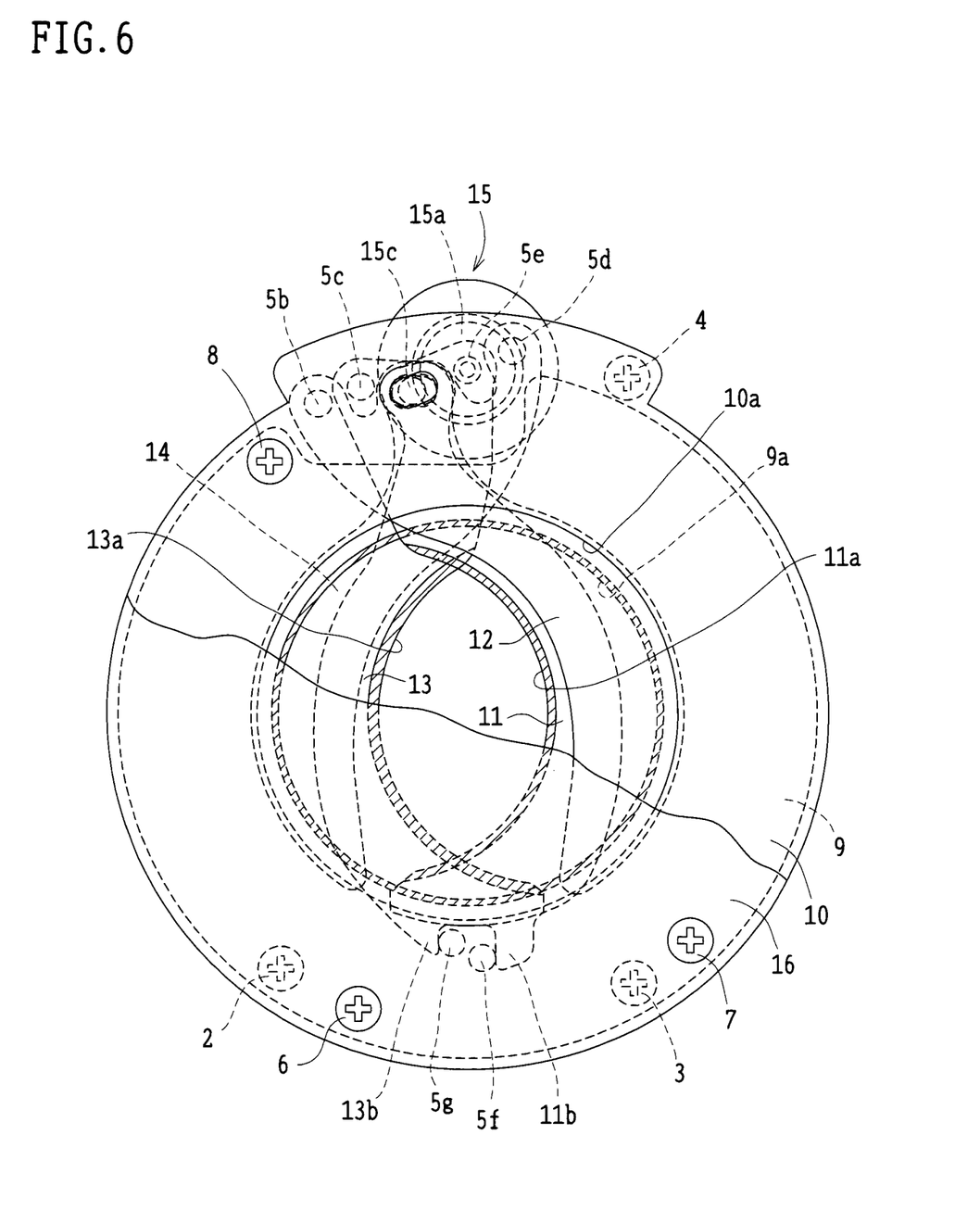
FIG. 6 is a front view of the second embodiment, showing a stopped-down optical path aperture observed from the light source side.

The present invention will be described in conjunction with two embodiments showing in the accompanying drawings. FIG. 1 to FIG. 3 illustrate a first embodiment. FIG. 1 is a front view showing a fully opened optical path aperture observed from a light source side. FIG. 2 is a sectional view substantially taken along line A—A shown in FIG. 1. FIG. 3 is a front view showing a stopped-down optical path aperture observed in the same manner as that shown in FIG. 1. FIG. 4 to FIG. 6 show a second embodiment. FIG. 4 is a front view of a fully opened optical path aperture observed from the light source side. FIG. 5 is a sectional view of the second embodiment taken substantially in the same manner as that in FIG. 2. FIG. 6 is a front view of a stopped-down optical path aperture observed in the same manner as that in FIG. 4.

[First Embodiment]

A diaphragm device according to the present embodiment is constructed so as to be easily installed in a lens frame (lens barrel) disposed in the vicinity of a light source. More specifically, a lens frame 1 shown in FIG. 2 is cylindrically shaped and has an annularly projecting mounting portion 1a therein. Referring to FIG. 1, the inner edge and the outer edge of the mounting portion 1a are indicated by double-dashed chain lines. The diaphragm device according to the present embodiment is constructed to be attached to the mounting portion 1a with three screws 2, 3 and 4.

As can be understood from FIG. 2, by three screws 6, 7 and 8 shown in FIG. 1, an intermediate plate 9 and a second base plate 10 are attached, in this order, to a first base plate 5 directly installed to the mounting portion 1a of the lens frame 1. An accommodating chamber is formed between the first base plate 5 and the intermediate plate 9, and another accommodating chamber is formed between the intermediate plate 9 and the second base plate 10. The first base plate 5 and the second base plate 10 have practically identical planar shapes, and circular apertures 5a and 10a concentrically formed at their centers have substantially the same diameter. The outer surface (the surface adjacent to a light source) of the second base plate 10, the inner peripheral surface of the aperture 10a, and the heads of the three screws 6, 7 and 8 are provided with gray or white heat-resistant painting (baking finish at 300° C. or more).

The intermediate plate 9 is slightly smaller than the two base plates 5 and 10, and a circular aperture 9a formed at its center has a smaller diameter than the aperture 5a or 10a. Hence, in the present embodiment, the maximum area and shape of the optical path apertures are restricted by the aperture 9a. In the intermediate plate 9, of the surface adjacent to the second base plate 10, i.e., the surface adjacent to the light source, at least the surface exposed to the light source side and the inner surface of the aperture 9a are provided with gray or white heat-resistant painting (baking finish at 300° C. or more). The intermediate plate 9 is considerably thinner than the two base plates 5 and 10. For this reason, FIG. 2 shows neither a hatched section of the intermediate plate 9 nor the aperture 9a.

In the first base plate 5, its surface adjacent to the second base plate 10, i.e., the surface adjacent to the light source, has four shafts 5b, 5c, 5d and 5e and two pins 5f and 5g. The pins 5f and 5g serve as stoppers. The pin 5f penetrates a hole formed in the intermediate plate 9 and juts out into the accommodating chamber adjacent to the second base plate 10, its distal end being in contact with the second base plate 10. The pin 5g has its distal end fitted in a hole formed in the intermediate plate 9.

In the accommodating chamber formed by the intermediate plate 9 and the second base plate 10, a stopping-down blade 11 and a covering blade 12 are disposed such that the stopping-down blade 11 is adjacent to the intermediate plate 9. The stopping-down blade 11 is rotatively installed to the shaft 5c, while the covering blade 12 is rotatively installed to the shaft 5b. The stopping-down blade 11 has a substantially arcuate aperture restricting edge 11a and also an abutting portion 11b that comes in contact with the pin 5f. Furthermore, gray or white heat-resistant painting (baking finish at 300° C. or more) is provided on the surfaces of the stopping-down blade 11 and the covering blade 12 that are adjacent to the second base plate 10, that is, the surfaces adjacent to the light source, the end surface of the aperture restricting edge 11a, and the end surface of the covering blade 12 jutting out in the aperture 10a. Theoretically, the sectional view shown in FIG. 2 should show only a part of the stopping-down blade 11 and the covering blade 12; however, for convenience sake, FIG. 2 shows the entire components.

Furthermore, in the accommodating chamber formed by the first base plate 5 and the intermediate plate 9, a stopping-down blade 13 and a covering blade 14 are disposed such that the stopping-down blade 13 is adjacent to the intermediate plate 9. The stopping-down blade 13 is rotatively installed to the shaft 5e, while the covering blade 14 is rotatively installed to the shaft 5d. The stopping-down blade 13 has a substantially arcuate aperture restricting edge 13a and also an abutting portion 13b that comes in contact with the pin 5g. Furthermore, the surfaces of the stopping-down blade 13 and the covering blade 14 that are adjacent to the intermediate plate 9, that is, the surfaces adjacent to the light source, and the end surface of the aperture restricting edge 13a are provided with gray or white heat-resistant painting (baking finish at 300° C. or more).

A motor 15 is attached to the surface of the first base plate 5 that is outside the accommodating chamber, i.e., the opposite surface from the light source. The motor 15 is a current-controlled motor. As shown in FIG. 2, a coil 15b is wound to wrap two bearings of a rotor 15a made of a permanent magnet. The rotor 15a is adapted to rotate by a predetermined rotational angle in a direction based on the direction of current supplied to the coil 15b. The rotor 15a has an output pin 15c located away from its center in the radial direction. The output pin 15c passes through an arcuate slot (not shown) formed in the first base plate 5 and is fitted in each of the four slots formed in the four plate members 11, 12, 13 and 14.

The mounting portion 1a of the lens frame 1 has a substantially circular hole, which is not shown. The motor 15 is inserted in the hole, most part thereof jutting out to the opposite side of the mounting portion 1a, i.e., to the opposite side from the light source. Although the slots formed in the four plate members 11, 12, 13 and 14 are shown in FIG. 1, they are closely overlapped, so that it is difficult to identify the configuration lines of the individual slots. For this reason, the four slots are not assigned any reference numerals.

An operation of the present embodiment will now be explained. FIG. 1 illustrates a state wherein the aperture 9a of the intermediate plate 9 is fully open, a maximum optical path aperture being restricted by the aperture 9a. To reduce the quantity of illuminating light in this state, the coil 15b of the motor 15 is energized in a forward direction to rotate the rotor 15a counterclockwise in FIG. 1. This causes the stopping-down blade 11 and the covering blade 12 to rotate clockwise, and the stopping-down blade 13 and the covering blade 14 to rotate counterclockwise. At this time, the distance from the shafts 5c and 5e on which the stopping-down blades 11 and 13, respectively, are mounted to the output pin 15c is shorter than the distance from the shafts 5b and 5d on which the covering blades 12 and 14, respectively, are mounted to the output pin 15c, so that the stopping-down blades 11 and 13 are rotated faster than the covering blades 12 and 14.

Thus, the stopping-down blade 11 and the covering blade 12 rotate clockwise with a reducing overlap, while the stopping-down blade 13 and the covering blade 14 rotate counterclockwise with a reducing overlap. They stop rotating when the abutting portion 11b of the stopping-down blade 11 comes in contact with the pin 5f, while the abutting portion 13b of the stopping-down blade 13 comes in contact with the pin 5g. FIG. 3 shows a state wherein the plates have stopped. At this time, the optical path apertures are restricted by the aperture restricting edges 11a and 13a of the stopping-down blades 11 and 13, respectively.

As can be understood from the state illustrated in FIG. 3, in the case of the present embodiment, without the covering blades 12 and 14, two more crescent optical paths would be undesirably formed at an edge opposite from the aperture restricting edge 11a and an edge opposite from the aperture restricting edge 13a in addition to the almond-shaped optical path aperture restricted by the two aperture restricting edges 11a and 13a. The covering blades 12 and 14 are rotated in a smaller range of angles than that of the stopping-down blades 11 and 13 so as to cover the two undesirable crescent optical paths. However, if the area of the mounting portion 1a of the lens frame 1 is larger, then the areas of the stopping-down blades 11 and 13 can be increased, thus obviating the need for the covering blades 12 and 14. In some cases, one stopping-down blade and one covering blade may be replaced by one larger stopping-down blade. The same will apply to a second embodiment to be discussed hereinafter.

To restore the state illustrated in FIG. 1 after the state shown in FIG. 3 is obtained as described above, current in the opposite direction is supplied to the coil 15b of the motor 15. This causes the rotor 15a to rotate clockwise in FIG. 3, so that the stopping-down blade 11 and the covering blade 12 are rotated counterclockwise, while the stopping-down blade 13 and the covering blade 14 are rotated clockwise. Hence, the stopping-down blade 11 and the covering blade 12, and the stopping-down blade 13 and the covering blade 14 restore the state illustrated in FIG. 1 while increasing their overlaps, and then they are stopped by stoppers (not shown).

Thus, in the present embodiment, the portions exposed to the light of the light source are all provided with gray or white heat-resistant painting in any one of the states illustrated in FIG. 1, FIG. 3 and other states between the states shown in FIGS. 1 and 3. This makes it possible to restrain the diaphragm device from becoming hot by reflecting most light rays even when the device is exposed to the light of the light source for an extended time. This arrangement makes it possible to restrain malfunctions or damage caused by seizure of actuating members, such as the stopping-down blades. The overheating can be further suppressed by adding an infrared reflecting material to the painting film.

As described above, in the present embodiment, the first base plate 5, out of the two base plates 5 and 10, is the one disposed on the opposite side from the light source and on which the motor 15 is mounted. Hence, the motor 15 is not exposed directly to the light of the light source, so that the coil 15b can be protected from disconnection due to heat. The present invention, however, is not limited to the above construction. The motor 15 may alternatively be mounted on the surface of the second base plate 10 that is adjacent to the light source. In this case, the motor 15 is covered by a covering member, and a surface of the covering member is also provided with gray or white heat-resistant painting. Although the motor 15 in the present embodiment is a current-controlled motor, the motor 15 may alternatively be a stepping motor. If a stepping motor is used, then three or more optical path apertures can be selected rather than only two as in the present embodiment. In the present invention, the stopping-down blades may be actuated by a plunger or by hand rather than using a motor. These alternatives will be applied also to the second embodiment to be discussed hereinafter.

[Second Embodiment]

Referring now to FIG. 4 through FIG. 6, the second embodiment will be explained. The construction of the present embodiment only partly differs from the construction of the first embodiment. Hence, the same reference numerals will be assigned to the same members and portions as those in the first embodiment, and the explanation thereof will be omitted. The operation of the present embodiment is entirely identical to that of the first embodiment, so that the description of the operation will be omitted. Thus, modification examples and advantages of the construction explained in the first embodiment will be directly applied also to the present embodiment.

An inner circumferential surface of an aperture 9a of an intermediate plate 9 in the present embodiment has a black finish rather than being provided with gray or white heat-resistant painting. In the case of the present embodiment also, a portion of the surface of the intermediate plate 9 that is adjacent to a second base plate 10, i.e., the surface adjacent to a light source, is provided with gray or white heat-resistant painting, while only a peripheral surface (the hatched region) of the aperture 9a is finished with black. The same applies to stopping-down blades 11 and 13. In other words, the edge surfaces of aperture restricting edges 11a and 13a of the stopping-down blades 11 and 13 in the present embodiment have the black finish, and are not provided with gray or white heat-resistant painting. Furthermore, the surface adjacent to the second base plate 10, i.e., the surface adjacent to the light source, is provided with gray or white heat-resistant painting, while only the peripheral surfaces (the hatched regions) of the aperture restricting edges 11a and 13a are finished black.

Thus, in the present embodiment, the edge surfaces and peripheral surfaces of the portions for restricting optical path apertures are finished black. However, providing at least the edge surfaces with the black finish will make it possible to prevent light of the light source from being irregularly reflected by the edge surfaces. This is advantageous especially when used with a data projector, such as a liquid crystal projector. The arrangement is not preferable from the viewpoint of measures against heat; however, the size of the black area hardly presents a problem in practical applications. The black color may be the color of a material itself of the members or may be provided by surface treatment.

In the present embodiment, a protective member 16 for blocking infrared rays is installed, with screws 6, 7 and 8, in front of the surface of the second base plate 10 that is adjacent to the light source with a predetermined interval provided therebetween. The protective member 16 is made of heat-absorbing glass and absorbs infrared rays emitted from the light source, contributing to protection of the diaphragm device from overheating. Therefore, if the light of a light source applied to the diaphragm device is intense, then the protective member 16 may be ideally provided. Moreover, providing the protective member 16 makes the aforesaid black finish easier. In the present embodiment, the protective member 16 is disk-shaped; however, forming the protective member 16 into an annular shape to cover, for example, the area other than the aperture 9a, will accordingly provide an advantage.

In the embodiments described above, maximum optical path apertures are restricted by the aperture 9a of the intermediate plate 9. The present invention, however, is not restricted to such a construction. The maximum optical path apertures may be alternatively restricted by the aperture 9a or 10a. If the construction of the second embodiment is used, then the edge surface or the like of an aperture whereby to restrict the maximum optical path aperture will be finished black. In the aforesaid embodiments, the intermediate plate 9 is provided to form the two accommodating chambers. Alternatively, however, the intermediate plate 9 may be obviated and only one accommodating chamber may be formed, as long as there is no danger of the distal ends of the two stopping-down blades 11 and 13 touching each other when reducing an optical path aperture.

In the aforesaid embodiments, the aperture restricting edges 11a and 13a of the two stopping-down blades 11 and 13 are formed with curves. Alternatively, however, each of the aperture restricting edges 11a and 13a may be formed by, for example, two straight lines so that a small optical path aperture is quadrate. Furthermore, in the aforesaid embodiments, the two stopping-down blades for changing the optical path aperture are provided by the two stopping-down blades 11 and 13 that rotate in opposite directions from each other. Alternatively, the stopping-down blades 11 and 13 may be replaced by two stopping-down blades that linearly slide in opposite directions from each other.

Thus, the present invention allows the diaphragm device to protect itself from overheating caused by the light of a light source without complicating the construction of the diaphragm device. This arrangement obviates the need for providing a protective means with a complicated construction between the diagram device and the light source, making the diagram device advantageous for achieving less expensive and smaller size of a projecting apparatus or various types of projector that incorporate the diaphragm device.

What is claimed is:

1. A diaphragm device for light source light adjustment comprising:
    two base plates disposed in the vicinity of the light source, each of which having an aperture for an optical path, an accommodating chamber being formed therebetween, and one of which being disposed adjacently to a light source; and
    two stopping-down blades that are disposed in the accommodating chamber and move toward or away from the apertures by relatively reciprocating so as to restrict the sizes of diaphragm apertures by aperture restricting edges thereof,
    wherein at least the adjacent-to-the-light-source surface of the base plate disposed adjacently to the light source and the adjacent-to-the-light-source surface of a member exposed to the light of the light source are provided with gray or white heat-resistant painting, the member being mounted on the base plate disposed adjacently to the light source.

2. The diaphragm device for light source light adjustment according to claim 1, further comprising:
    an electromagnetic driving means attached to the base plate disposed on the opposite side from the light source outside the accommodating chamber,
    wherein an output means thereof reciprocates the stopping-down blades in the accommodating chamber.

3. The diaphragm device for light source light adjustment according to claim 1 or 2, wherein edge surfaces of the aperture restricting edges of the stopping-down blades are finished black.

4. The diaphragm device for light source light adjustment according to claim 1 or 2, wherein a protective member for blocking infrared rays is installed to the base plate disposed adjacently to the light source such that it covers the front surface of the base plate that is adjacent to the light source.

5. The diaphragm device for light source light adjustment according to claim 1 or 2, wherein the two stopping-down blades are rotatively mounted on one of the two base plates, and the aperture restricting edges are formed to have substantially arcuate curves.

6. The diaphragm device for light source light adjustment according to claim 3, wherein the two stopping-down blades are rotatively mounted on one of the two base plates, and the aperture restricting edges are formed to have substantially arcuate curves.

7. The diaphragm device for light source light adjustment according to claim 3, wherein a protective member for blocking infrared rays is installed to the base plate disposed adjacently to the light source such that it substantially covers the front surface of the base plate that is adjacent to the light source.

8. The diaphragm device for light source light adjustment according to claim 3, wherein edge surfaces of the aperture restricting edges of the stopping-down blades are finished black.

9. The diaphragm device for light source light adjustment according to claim 4, wherein edge surfaces of the aperture restricting edges of the stopping-down blades are finished black.

10. The diaphragm device for light source light adjustment according to claim 3, wherein the two stopping-down blades are rotatively mounted on one of the two base plates, and the aperture restricting edges are formed to have substantially arcuate curves.

11. The diaphragm device for light source light adjustment according to claim 4, wherein the two stopping-down blades are rotatively mounted on one of the two base plates, and the aperture restricting edges are formed to have substantially arcuate curves.

12. The diaphragm device for light source light adjustment according to claim 10 or 11, wherein the two stopping-down blades are rotatively mounted on one of the two base plates, and the aperture restricting edges are formed to have substantially arcuate curves.

* * * * *